Oct. 15, 1940.   C. T. McGILL   2,217,692
WATER CONDITIONING EQUIPMENT
Filed May 11, 1939   5 Sheets-Sheet 1

Oct. 15, 1940.                C. T. McGILL                2,217,692
                      WATER CONDITIONING EQUIPMENT
                        Filed May 11, 1939            5 Sheets-Sheet 2

Inventor:
Chester T. McGill
By
Wilson, Dowell, McCanna & Wiatereen
Attys.

Oct. 15, 1940.   C. T. McGILL   2,217,692
WATER CONDITIONING EQUIPMENT
Filed May 11, 1939   5 Sheets-Sheet 3

Oct. 15, 1940. C. T. McGILL 2,217,692
WATER CONDITIONING EQUIPMENT
Filed May 11, 1939 5 Sheets-Sheet 4

Inventor:
Chester T. McGill
By
Wilson, Dowell, McCanna & Wintercorn
Attys

Patented Oct. 15, 1940

2,217,692

UNITED STATES PATENT OFFICE 2,217,692

WATER CONDITIONING EQUIPMENT

Chester T. McGill, Elgin, Ill.

Application May 11, 1936, Serial No. 78,974

17 Claims. (Cl. 210—24)

This invention relates to water conditioning equipment generally, and has particular reference to all such equipment employing beds of water treatment or water softening minerals or filtering mediums, all of which require cleansing and reconditioning from time to time.

My invention while adapted for these other applications has been primarily designed with a view to use in two-flow or multiple-flow water softeners of the base exchange type, with a view to providing confined beds without filter screens or strainers, and thus avoid the loss of zeolite during softening operation and also in backwashing and regenerating.

A salient feature of my invention lies in the novel construction and arrangement herein disclosed, whereby fast flow rates can be employed for thorough agitation and good cleansing of the mineral in backwashing while still obtaining a sufficiently low rate of flow for sedimentation purposes that the sediment will be carried off without losing mineral with it. In the past, it was necessary to make a compromise in the designing of water softeners so that the rate of flow in backwashing would not be sufficient to cause loss of material, and, as a result, with the lower flow rate necessarily employed, there was insufficient agitation and consequently inefficient cleansing. In accordance with my invention, the full, fast flow is employed for effective agitation and good cleaning of the mineral, and thereafter the flow is divided, that portion for carrying off released sediment being restricted sufficiently to avoid likelihood of mineral being carried away with the sediment. In this connection, I provide regulating check valves in the waste pipes adjusted so as to permit only a certain rate of flow at a specified operating pressure so that only a fraction of the water—sufficient to carry away the sediment—will flow through the waste pipes, while there is fast flow between the two tanks sufficient to return mineral washed from one tank to the other during the softening process.

Another important feature of my invention consists in the provision of a clean-out manifold in the gravel bed under the mineral in the upflow tank arranged to afford a preliminary backwash flow locally through the gravel bed prior to the main backwash flow through the two mineral beds. In connection with the manifold I also provide, optionally, two drain valves which when one is opened and the other closed will permit the backwash through the gravel bed just mentioned, but which when the first valve is closed and the other opened will permit agitation of the mineral bed by upflow of water at a fast flow rate from said manifold as desired under certain conditions, as hereinafter explained.

Still another important feature consists in the provision of inflow and outflow manifolds in the bottoms of the tanks disposed in the coarse gravel, for distribution of the water flow uniformly through the beds, these manifolds being carried on tubular elements extending upwardly from the center of the bottom of the tanks, and said elements having radial openings provided therein to assure a certain amount of flow through the gravel beneath the manifolds in the bottoms of the tanks and avoid accumulation of undesired matter below the manifolds.

Another salient feature of my invention consists in the use of a single multi-position multi-port control valve in connection with the equipment arranged to afford flow in predetermined directions and at predetermined flow rates in the different positions of the valve.

The invention is fully described in the following specification in which reference is made to the accompanying drawings, wherein—

The same reference numerals are applied to corresponding parts throughout the views.

As indicated at the commencement of this specification, my invention is applicable to the broad field of water treatment and conditioning. Thus, while specific mention will be made hereinafter to water softening, it should be evident that most, if not all, of the features described with special reference to use in a water softener are useful to equal advantage in other water conditioning equipment and in filters, in fact, wherever similar problems incident to cleansing and reconditioning a bed or beds of mineral or like material are presented. For example, there are units that will take out phenol or other tastes or remove iron, suspended matter, free $CO_2$, or odors from the water, without necessarily involving the softening thereof. Such units are however directly analogous to softeners and can use similar improvements. The analogy extends to the point that where a softener employs a brine tank for regeneration, one of these other water conditioners will have a chemical tank for furnishing the proper sterilizing agent, alkalizing agent, acidifying agent, oxidizing agent, or reducing agent, depending of course upon the kind of water treatment. The following description of three different equipments should be understood accordingly and the claims likewise construed accordingly.

*Two-flow softener—Figs. 1–8*

Figures 1, 1A, 2:
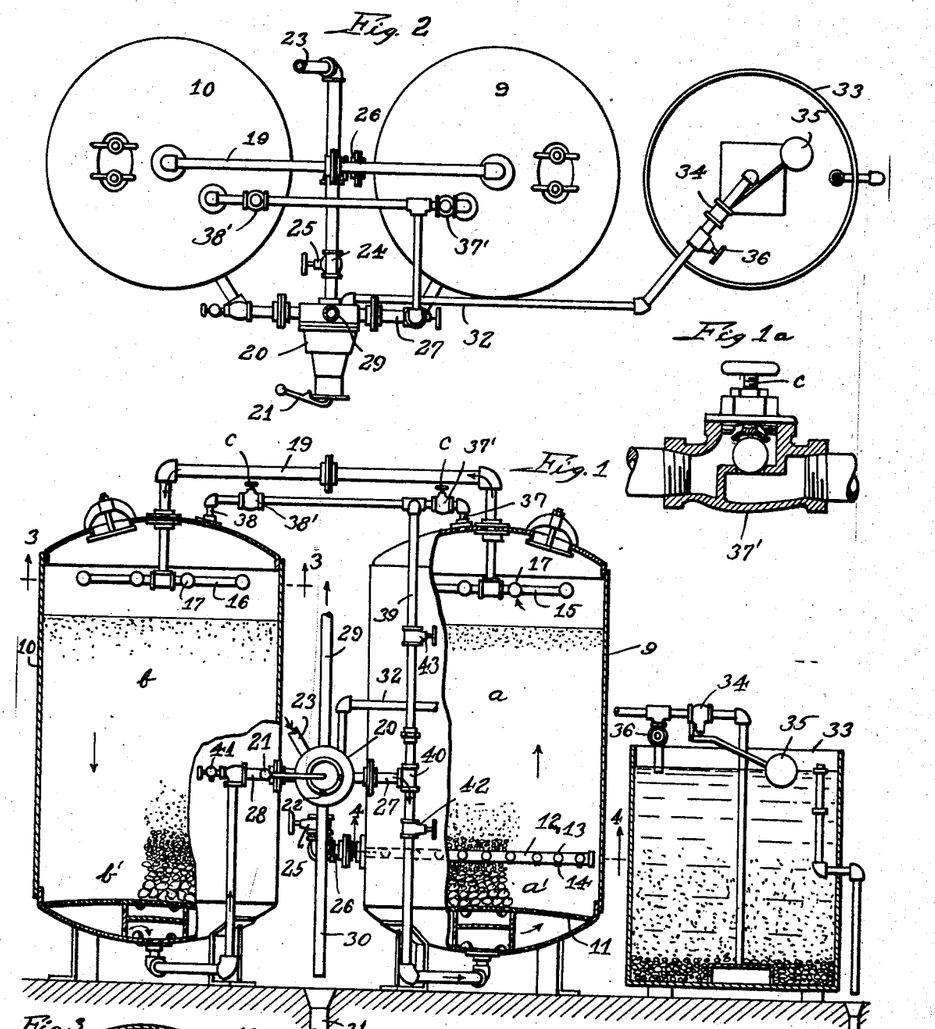
Figure 1 is a view mainly in vertical cross-section and partly in front elevation of a two-flow water softener and associated brine tank embodying many of the features of my invention mentioned above.
Fig. 1a is a cross-section on a larger scale through one of the two regulating check valves shown in Fig. 1.
Fig. 2 is a plan view of Fig. 1.
Figure 3:
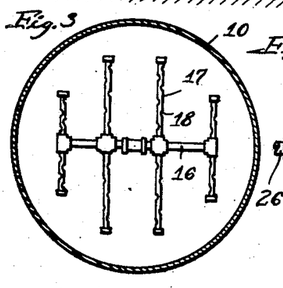
Figs. 3 and 4 are cross-sections on the correspondingly numbered lines of Fig. 1, showing in Fig. 3 one of the upper manifolds employed in the freeboard space above the mineral beds, and in Fig. 4 the clean-out manifold employed in the gravel bed under the mineral in the one tank.
Figure 4:
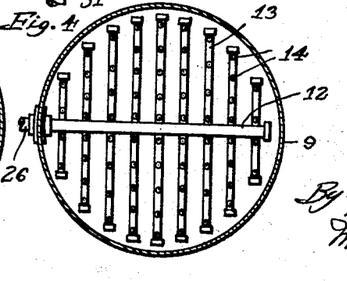
Figure 5:
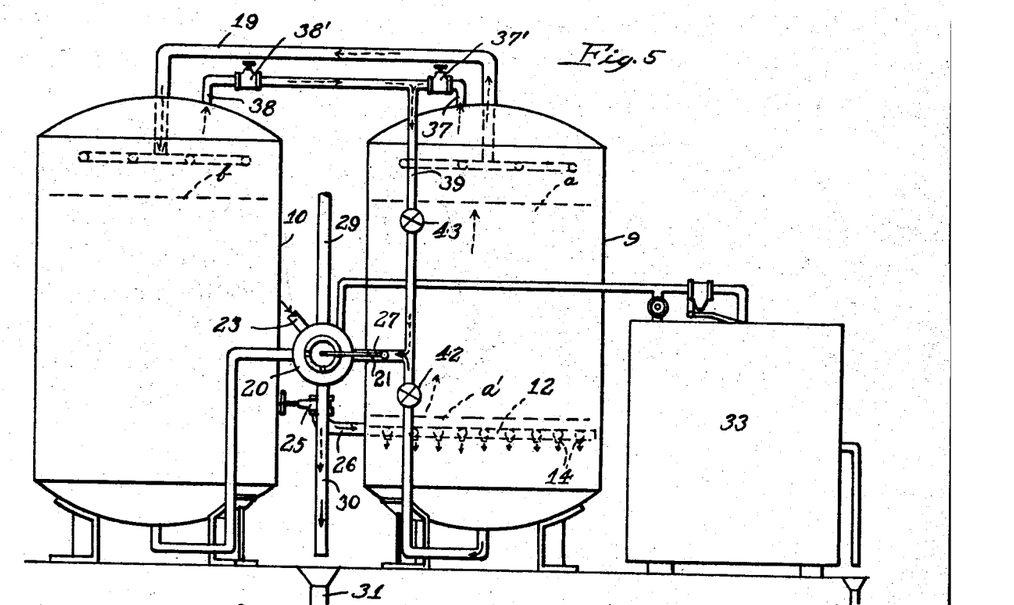
Figs. 5 to 8 are diagrams corresponding generally to Fig. 1, which serve to illustrate the different steps in a complete regeneration.

Referring first mainly to Figs. 1 and 2, this softener comprises the two tanks 9 and 10 containing beds a and b, respectively, of zeolite or other water softening mineral supported on graded quartz, gravel or other distributing filtering beds a' and b', respectively. Perforated distributor plates 11 support the gravel beds, as shown, and distribute the water flow, although it will be understood the distribution system shown in Figs. 9 and 12 may be employed instead. A clean-out manifold 12 is provided in the bottom of the tank 9 near the surface of the gravel bed a', and has the laterally extending pipes 13 thereof provided with jet openings 14. Manifolds 15 and 16 are suspended from the tops of the tanks 9 and 10, respectively, in the freeboard space above the mineral beds, as shown, and the laterally extending pipes 17 thereof have jet openings 18 provided therein. These upper manifolds 15 and 16 are interconnected as shown at 19.

Figure 13:
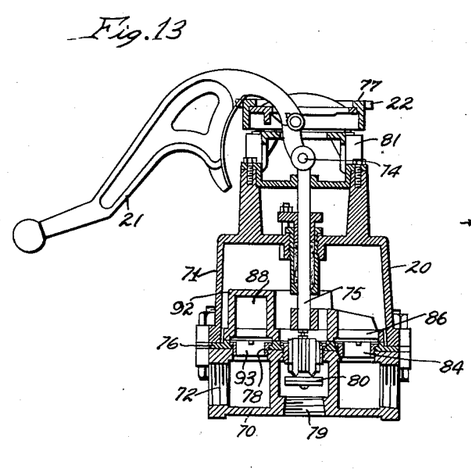
Fig. 13 is a vertical section of the multi-port valve shown in Figs. 1, 2, and 5 to 8.
Figure 14:
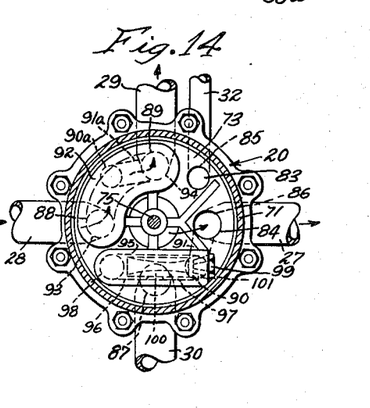
Fig. 14 is a transverse section of said valve.

A single multiple port valve, shown at 20, for controlling the flow of water and brine through the softener, as hereinafter described, is used. While any multiport valve suitable for the purpose may be used, I have illustrated the valve 20 in Fig. 13 as constructed along the lines of that disclosed in Riche Patent 2,047,131 issued July 7, 1936, the same comprising a body or stator member 70 carrying a housing 71 and having a plurality of ports 72 provided therein, the housing 71 enclosing a ported stem plate 73 to which the hand lever 21 of the valve is pivotally connected by means of the pivot 74 at the outer end of the stem 75. The stem plate 73 as described in the Riche patent is adapted to be raised off the rubber seat 76 by means of the lever 21 and stem 75 and turned to another operative position and reseated and locked in the new position by entry of a portion of the lever 21 in the associated notch 22 in the index plate 77 mounted on the housing 71. In each position, the ports of the plate 73 register with ports in the body to determine a certain direction of flow and the ports 72 in the body or restriction plugs 78 therein predetermine the rate of flow. Water is supplied to the body 70 of the valve from any suitable source of hard water supply, as for example the city mains, through a pipe 23 connected, as indicated in Fig. 2, to the back of the valve at the center thereof where the inlet port 79 is provided, as shown in Fig. 13. In the particular valve shown, 80 is a shut-off valve arranged to be closed automatically when the stem plate 73 is unseated by means of the lever 21. At 81 are indicated housings in which spring means are encased serving as described in the Riche patent to exert pressure on the stem 75 to hold the plate 73 seated until such time as the lever 21 is swung outwardly and the plate 73 is unseated, at which time the spring pressure is transferred to the housing 71. 83 and 84 are two ports through the stem plate 73 45° apart which will register with ports 85 and 86 in the body 70 when the valve is in softening position as shown in Fig. 14. The port 86 and three other ports 87, 88, and 89 in the body 70 are spaced 90° apart. In addition to the port 85 which is midway between ports 86 and 89, the body 70 has still two other ports 90 and 90a, the port 90 being midway between ports 86 and 87 and the port 90a being midway between the ports 88 and 89. Port 90 is connected to port 86 by passage 91 and port 90a is connected to port 89 by passage 91a. The stem plate 73 has a hollow arcuate boss 92 thereon interconnecting two ports 93 and 94 in the stem plate 90° apart. Another hollow boss 95 on the stem plate 73 has two chambers 96 and 97 in its opposite ends, the chamber 96 communicating with the port 98 in the stem plate and the chamber 97 being in open communication with the inside of the housing 71 through an injector nozzle 99 which is adapted to discharge water into the chamber 96 through a venturi 100 so as to entrain brine through the port 101 provided in the stem plate 73 communicating with the chamber 97, when the port 101 is in register with the body port 85 in the brining position of the valve disclosed in Fig. 7. The body ports 86 and 88 have the pipes 27 and 28, shown in Fig. 1, connected therewith, and the body port 89 has the service pipe 29 connected therewith, and the body port 87 has the drain pipe 30 connected therewith. In the softening position of the valve, as indicated by the arrows in Fig. 14, the incoming raw water flows into the valve 20 and out through the pipe 27 to tank 9 and returns as softened water from tank 10 through pipe 28, the softened water being conducted through boss 92 in the valve 20 and discharged to the service system through pipe 29. This corresponds to the flow indicated in Fig. 1. The other flows illustrated in Figs. 5 to 8 can be traced similarly by noting the position of the hand lever 21 in those views as compared with the position of the hand lever 21 in Fig. 1, it being understood that the stem plate 73 is shifted with the hand lever from one position to another to obtain the different flows illustrated. Thus, this single multiple port valve affords several important advantages over the conventional valves; the operation of the valve to a prescribed position establishes all of the necessary connections for a certain direction of flow through the softener, whereas an operator might get confused in the opening and closing of a number of separate valves and not secure the right flow, and, then too, the correct flow rates are predetermined in the valve itself, whereas if the operator were expected to secure such flows by opening certain valves, there would be danger of too much variation in flow, especially if the valves became corroded and tended to stick. The importance of correct flow rates in the regeneration of this softener will be clear in the later description. Referring again to Fig. 2, at 24 is indicated a T connection on the supply pipe 23 for delivery of hard water from the pipe 23 through an auxiliary hand valve 25 connected, as indicated at 26, with the lower cleanout manifold 12. A pipe connection 27 extends from one side of the valve 20 to the bottom of the tank 9, and another pipe connection 28 extends from the opposite side of the valve to the bottom of the tank 10. A pipe 29 extending from the top of the valve 20 connects with the service system which is to be supplied with soft water. The pipe 30 extending from the bottom of the valve 20 leads to the sewer connection 31, or any other drain receptacle. At 32 is indicated a pipe connection on the back of the valve 20 communicating with the brine tank 33. A valve 34 controlled by a float 35 in the brine tank shuts off communication between the pipe 32 and the brine tank when the float 35 drops a predetermined distance, namely, when a predetermined amount of brine has been withdrawn through the pipe 32. An important advantage of this arrangement is the more efficient regeneration of the softening mineral due to the gradual reduction in concentration of brine entering the softener toward the end of the brining operation. This is caused by the gradual closing of the valve 34 after float 35 has lowered more than half its total predetermined distance of travel. The hand valve 36 which is normally closed can be opened, as hereinafter described, to replenish the water supply in the brine tank by delivery of water through the pipe 32.

Pipes 37 and 38 lead from the top of the tanks 9 and 10, respectively, and are connected to regulating check valves 37' and 38'. These valves are constructed as disclosed in Fig. 1a, and are adjusted by means of their screws c to permit only a given rate of flow of water past the balls therein at a specified operating pressure, away from the associated tanks 9 and 10. The discharge sides of the two check valves communicate with the pipe 39 connected through the T 40 with the pipe 27. These check valved connections are for the drainage of sediment and foreign matter from the two tanks, automatically at the proper flow rates during backwashing, and provide therein the "adjustably fixed restrictions" referred to in the claims, permitting flow therethrough only at a fraction of the rate of flow permitted from one tank to the other through the manifolds 15 and 16 and their connecting pipe 19, the screw c constituting the means for adjusting said restrictions and being thereafter left undisturbed in the operation of the softener.

The cycle of operation can now be described referring to Figs. 5 to 8 for the various stages of regeneration, and to Fig. 1 for the softening operation.

*Softening*

In softening operation, the valve 20 has its lever 21 in the position shown in Fig. 1, and the water flows in the directions indicated by the arrows, that is, the incoming hard water flows through pipe 23 and valve 20 into pipe 27 to the bottom of the tank 9; from there the water in flowing upwardly through the distributor plate 11 and gravel bed a' is distributed and flows upwardly uniformly through the mineral bed a, and is thereby softened; the softened water leaves the tank 9 through the upper manifold 15, and flows through pipe 19 and manifold 16 into the top of the tank 10; from there it flows downwardly through the mineral bed b and gravel bed b' and out of the tank through the pipe 28 to the valve 20, and thence through pipe 29 to the service system. When water is drawn at flow rates in excess of a rate of about three (3) gals. per minute per square foot area of the tank, the upflow through mineral bed a is sufficient to cause mineral to be carried in suspension, and as the flow rate is increased, suspended mineral reaches the pipes 17 of the manifold 15 and is carried over with the outgoing water through the pipe 19 into the top of the tank 10 where it comes to rest on top of the bed b. Thus, a finer mineral can be used if desired and the tanks can be filled more nearly full, that is, with less freeboard space above the beds, without the usual danger of loss of mineral in operation. The use of finer mineral is of advantage because of increased softening capacity and quicker softening and regenerating action, besides being usually less expensive than the coarser minerals. Furthermore, it has been proved that a softer operating on this two-flow principle will give up a greater exchange value per cubic foot of mineral than the ordinary upflow or downflow softener operating with single flow. One of the reasons for this additional capacity is that all of the mineral in bed a will become completely exhausted before the mineral in bed b is exhausted. The water passing through will give up hardness as long as there is any exchange value in the mineral and so long as there is a sufficient depth of mineral unexhausted.

The outgoing water can be tested for hardness by opening the cock 41. When the softener has given up all of its base exchange and the water coming from the softener tests hard, it is time to regenerate.

*Preliminary backwash*

The first step in regenerating the softener consists in preparing the gravel bed a' and, if necessary, the mineral bed a. It will be noticed that there are two valves 42 and 43 in the pipes 27 and 39, respectively. These valves are normally left open, but at the commencement of regeneration, the valve 43 will be closed at the same time that the lever 21 of the valve 20 is shifted 180° from the softening position shown in Fig. 1 to the backwash position shown in Figs. 5 and 6. Then the operator opens the valve 25 to supply raw water to the clean-out manifold 12 for the preliminary backwash operation illustrated by the short solid arrows in Fig. 5. In this operation, raw water is discharged downwardly from the jets 14 through the gravel bed a' to flush out the sediment and other foreign matter, the water carrying away these impurities being conducted from the bottom of the tank through the waste pipe 70 30 to the sewer. The manifold 12 disposed as it is near the top of the gravel bed a' helps to support and maintain this bed in a definite position and prevents channeling, "bed-blowing," etc. It also affords a cleansing flow in the opposite direction from that in which the impurities are carried into the gravel bed, so that these impurities are easily and quickly released and flushed out. It is obviously of advantage to have the full force of the water played upon the gravel bed for this operation, instead of expending much of the force in passing the water through the entire bed of mineral resting on the gravel bed.

When the water softener is operated at a slower flow rate than that for which it is designed, the flow of water through the gravel bed $a'$ and mineral bed $a$ is not sufficient to keep the mineral agitated and suspended, and the gravel bed $a'$ may gradually accumulate suspended solids and become clogged, frequently to such an extent as to cause the upflow water to channel up through the mineral $a$ due to the slow flow rate of the water. It is under such circumstances that I advocate a second step in the preliminary backwash, illustrated by the longer dotted arrows in Fig. 5, in which the lower valve 42 will be closed and the upper valve 43 opened, thus causing the incoming raw water from manifold 12 to pass upwardly through the mineral $a$ with sufficient force to break up the mineral and agitate it so as to thoroughly clean this mineral. A portion of the water—approximately 50%, carrying the released sediment, will pass upwardly through the pipe 37 and out through valve 43 to the drain, while the remaining portion flows into collector manifold 15, then through the pipe 19 into the top of tank 10 through distributor manifold 16, carrying with it lighter mineral from the top of the bed $a$ along with some of the released sediment. When the water enters tank 10, the mineral being heavier settles to the top of bed $b$, and the sediment being lighter escapes with the outgoing water through pipe 38 to the drain. In this passage of the water from tank 9 to tank 10, any lumps or packs of mineral carried with the water are subjected to a scouring action in passing through the manifolds and connecting pipe and are thereby broken up and any sediment therein is released.

Main backwash

Figure 6:
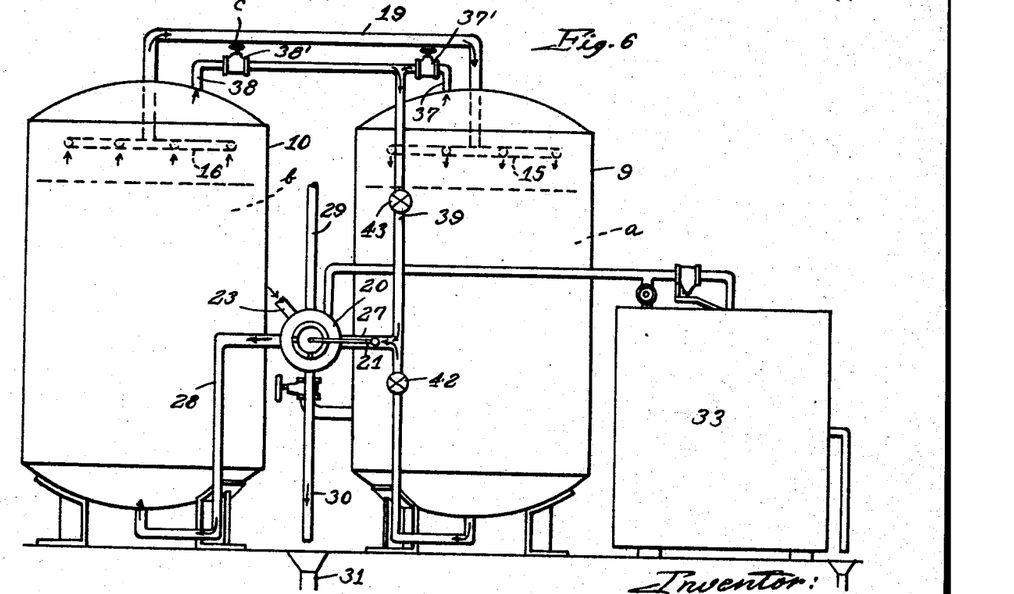

In this operation, which is illustrated in Fig. 6, the main object is to release the compacted mineral in bed $b$ through which there has been downflow during softening, stir it up thoroughly, agitate the mineral, and release the accumulated sediment or iron precipitate. To accomplish this, a very fast flow rate is used, usually about 12 gals. per minute per square foot area of the tank. With this fast flow rate, the mineral is thoroughly agitated and cleansed in much less time and with much less water going to the drain than when low flow rates are used. At the fast flow rate, all of the mineral in bed $b$ is held in a suspended condition, and a portion of the top of the bed and all of the finer mineral that was previously carried over to bed $b$ from bed $a$ during softening operation is carried back through pipe 19 into the top of tank 9. Now, bearing in mind that there is an upflow through bed $b$ of 12 gals. per minute, which, by the way, is much faster than is ordinarily used in other softeners—5 to 7 gals. per minute being customary—4 gals. of this 12 gals. carrying released sediment will pass out through the check valve 38', due to the adjustment of its screw $c$. The remaining 8 gals. pass through the manifold 16 and pipe 19 to the tank 9, carrying with it sediment, iron precipitate, and softening mineral. This water issuing from upper manifold 15 into the freeboard space above the bed $a$ is now divided into equal parts, 4 gals.—that is, 50% of this water—passes downwardly through bed $a$ and out of the bottom of the tank through pipe 27, and the other 4 gals. carrying released sediment flows through the check valve 37' and is conducted with the other sedimentation water discharged from the check valve 38' through the pipe 39 to the pipe 27, to flow through the valve 20 and out through the waste pipe 30 to the sewer. For illustration, a tank 48 inches in diameter, having a 12.6 square foot area, operating at a 12 gal. per minute flow rate per square foot would have flowing therethrough approximately 150 gals. per minute. Hence, 150 gals. per minute delivered through the supply pipe 23 would pass through the valve 20 and into the bottom of tank 10 and flow upwardly through bed $b$. This flow rate is easily sufficient to separate the sediment from the mineral, thoroughly agitate the mineral and put it in a clean wholesome condition. 50 gals. of this flow rate pass through check valve 38' and the remaining 100 gals. pass out through the manifold 16 and pipe 19 to the tank 9. This 100 gal. flow rate is easily sufficient to return all of the zeolite mineral that was carried over into tank 10 during the softening operation, and anywhere from 6 to 12 inches of additional mineral from tank 10 will be carried to tank 9. This incidentally provides a thorough cleaning of the mineral and re-classification of the mineral in bed $b$. The mineral and water in passing through the pipe 19 travels many times faster than it does in passing through the bed $b$, and consequently that portion of the mineral is given an additional scouring and cleansing to separate the mineral from the sediment, so that when the water carrying the mineral is released into the freeboard space above the mineral bed $a$, the 50 gals. allowed to escape through valve 37' will carry with it the lighter sediment, whereas the mineral which is heavier than the sediment will gravitate and be conducted with the other 50 gals. of the backwash flow rate to the top of the mineral bed $a$.

A unique feature of my method of sedimentation lies in the fact that the mineral cannot be carried to the drain, despite the increased flow rates used to release the scum and other foreign matter. The mineral never gets above the manifolds 15 and 16; only the lighter sediment rises into this freeboard space in going out to the drain.

Figure 7:
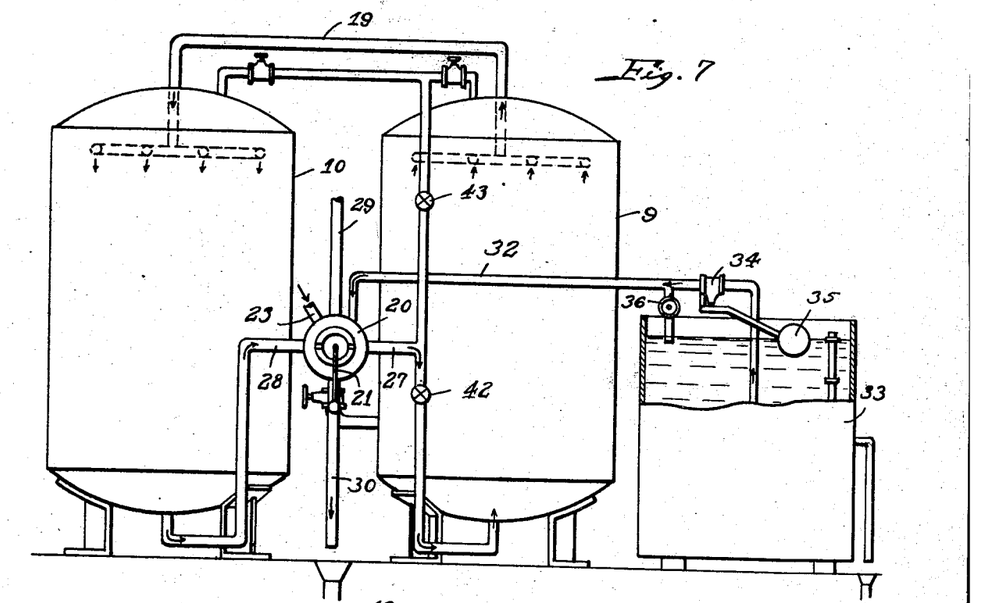
Figure 8:
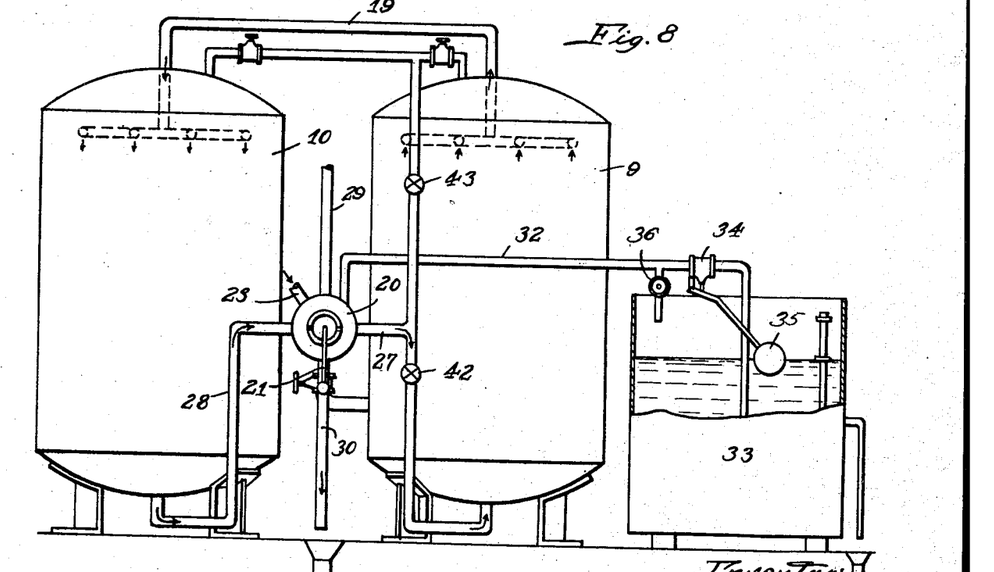

After the backwash flow has continued for a specified time, sufficient to accomplish the purposes stated, the hand lever 21 is moved from the position of Fig. 6 90° in a clockwise direction to that of Fig. 7 for the brining or salt wash operation.

Salt wash

The brine is prepared in the brine tank 33 by any usual or preferred method, and the brine solution is drawn from the bottom of the tank, as indicated from the construction illustrated in Fig. 1, whereby to insure a saturated brine solution. With the lever 21 of valve 20 in the position shown in Fig. 7, the raw water delivered to the valve from pipe 23 siphons brine from the tank 33 through the pipe 32, so that brine is conducted with the water through the pipe 27 into the bottom of tank 9, and the brine in the passage of the water upwardly through mineral bed $a$ and downwardly through mineral bed $b$ will restore the mineral in these beds to their original condition in accordance with the base exchange principle, and the spent brine, carrying with it released calcium and other hardness, is conducted from the bottom of tank 10 through pipe 28 to the waste pipe 30 and thence to the sewer. During this operation, the same as during normal softening operation, the regulating check valves 37' and 38' stay closed due to back pressure thereon through pipe 39 which communicates with the pipe 27 that in turn communicates with the source of water supply under pressure, namely, pipe 23. The valve 20 is left in the brining position until the level in the brine tank 33 has lowered to a predetermined distance, at which time the float 35 has lowered sufficiently to close the valve 34. The flow of raw water can now be continued for rinsing the beds to clear out all traces of brine and released calcium and other hardness.

Rinse

The rinsing is done entirely with the valve in the same position as for brining. The flow in this position is therefore in the same direction as previously described in referring to Fig. 7.

After the regeneration is completed, the lever 21 is moved back to the position shown in Fig. 1 to resume the normal softening operation. Usually after regeneration has been completed, the operator opens the valve 36 at the brine tank 33 to refill the tank.

It is important to note that in this softener the water flow for softening operation is always in the same direction. This avoids the objection present in other two-flow softeners which operate with reversed flow after each regeneration, of having whatever impurities that have collected at the inlet end of the system during one softening operation, picked up by the outgoing softened water in the next softening operation when the water flow is in the opposite direction through the softener.

Figure 9:
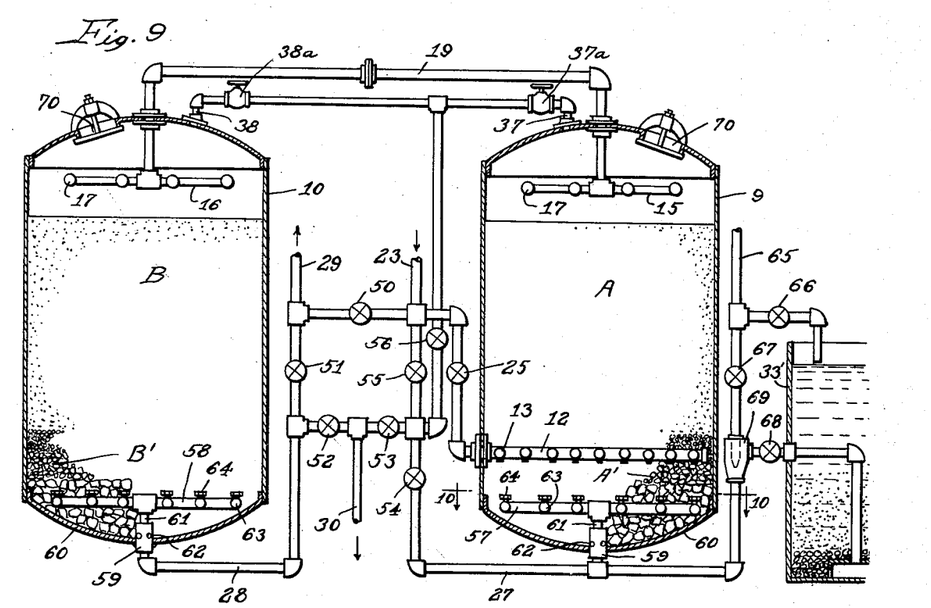
Fig. 9 is a view similar to Fig. 1, showing a modified or alternative construction for a water conditioning equipment.
Figure 10:
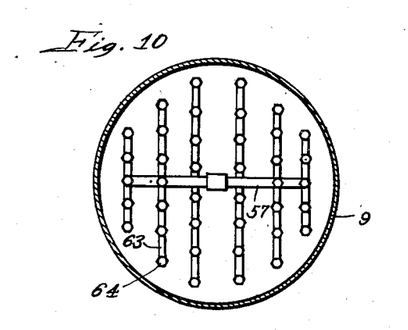
Fig. 10 is a section on the line 10—10 of Fig. 9, showing the up-flow manifold.
Figure 11:
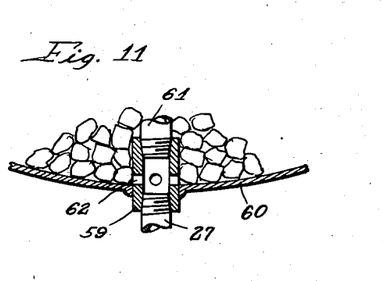
Fig. 11 is an enlarged sectional detail of the manifold support showing its relation to the bottom of the tank and the surrounding coarse gravel.

Water conditioner—Figs. 9–11

This equipment is similar to that shown in Figs. 1 to 4 in having the two tanks 9 and 10 containing beds A and B with manifolds 15 and 16 suspended in the freeboard space above the beds from the tops of the tanks, as shown. These manifolds also have laterally extending pipes 17 in which jet openings are provided as in the other construction, and the manifolds are interconnected by the pipe 19. The construction is also similar to the previous one in that pipes 37 and 38 lead from the top of the tanks to carry off sediment. In this case, while I have shown hand valves 37a and 38a in place of the regulating check valves 37' and 38', it should be understood that I may employ check valves or any other type to regulate flow from the tanks 9 and 10. There is also, as in the previous construction, a cleanout manifold 12 near the surface of the gravel bed A' having laterally extending pipes 13 in which jet openings are provided, as previously described. The hand valve 25 controls the delivery of water to the manifold 12.

This equipment differs from the one of Figs. 1 to 4 in substituting a plurality of hand valves 50—56 for the single multi-port valve 20 to control communication between the tanks 9 and 10 and water supply pipe 23, service pipe 29, and drain pipe 30. Furthermore, instead of the perforated distributor plates 11 provided in the other unit, I provide water distributing manifolds 57 and 58 in the coarsest gravel of beds A' and B' in the bottom of the tanks 9 and 10, respectively. Tubular members or couplings 59, welded or otherwise suitably secured in openings in the center of the bottom walls 60 of the tanks, provide supports for the manifolds, as indicated at 61, and also places for connecting the pipes 27 and 28 to the bottoms of the tanks. These couplings 59 have radial holes 62 provided therein level with the inside of the bottoms 60, so that when water is being delivered to either of the manifolds 57 and 58 or is being discharged through either of these manifolds, a certain amount of the flow will occur through the holes 62, thus avoiding the condition of stagnancy in the space beneath the manifolds, and accordingly also avoiding the condition of trapping in this space brine or other solution, depending upon what kind of equipment it is and accordingly what kind of reconditioning agents are employed. This construction enables me to dispense with the use of concrete to fill the bottom of the tanks up to the level of the manifolds, and, of course, it is quite an advantage to eliminate the concrete, because when manifolds are set in concrete and it becomes necessary after several years of service to replace one of the laterally extending pipes 63 or some of the nozzles 64, it is necessary to remove the concrete, whereas with this present construction the loose gravel can be removed and replaced easily, and the work can be done in much less time and at a proportionately smaller expense. Furthermore, there is a considerable saving in time in making the installation, because the gravel can be poured in and leveled in a few minutes, whereas it usually requires from twenty-four to thirty-six hours for concrete to dry out sufficiently to permit going ahead with the rest of the work. Thus, the ultimate cost of the equipment is considerably reduced with my present construction, and maintenance expense likewise.

The reconditioning of the mineral beds A and B necessitates a chemical tank 33' similar to the brine tank 33 in the unit shown in Fig. 1, and this tank will contain the proper salt, sterilizing agent, alkalizing agent, acidifying agent, oxidizing agent, or reducing agent, to suit the unit and the use to which it is put. In other words, while the unit of Fig. 9 might be a base exchange softener having zeolite mineral requiring salt brine for its regeneration, it is obvious that in some other unit otherwise of the same or similar construction, but having some other mineral therein for the conditioning of water, other than softening, as, for example, the removal of taste or odor, or both, the removal of iron, the removal of free $CO_2$, or the removal of some other objectionable matter in the water, the tank 33' will contain the requisite reconditioning agent. The pipe 65 supplies water to the tank 33' for the reagent therein, and also supplies water to carry the reagent into the beds A and B. The valves 66—68 control the operations of refilling the tank and withdrawing the reagent therefrom, and an ejector 69 serves to withdraw the reagent from the tank and mix it with the water from the pipe 65 so that it will be carried through the mineral beds.

In operation, the tank 9 will serve as the upflow tank and the tank 10 as the downflow tank. The raw water to be conditioned, whether it is to be softened or what not, enters at 23 and passes through valves 55 and 54 and line 27 into the bottom of tank 9 where it is distributed mainly through the nozzles 64 of manifold 57, and to a small extent through holes 62 in the coupling 59 near the bottom of the tank. The water then flows upwardly first through the gravel bed A' and then through the mineral bed A and through manifold 15 and connecting pipe 19 into tank 10 through manifold 16. The water then flows downwardly through mineral bed B and gravel bed B' and out mainly through nozzles 64 of manifold 58 and to some extent through holes 62 in coupling 59. The outgoing softened or otherwise conditioned water flows through line 28 and valve 51 to the service line 29. During this operation the valves 50, 52, 53, 56, and 25 are all closed, and the same is true of the valves 37a and 38a and valves 66, 67 and 68.

In backwashing and reconditioning this unit, the valve 25 associated with the clean-out manifold 12 is opened and valve 55 is closed and valve 53 opened, thus permitting water to flow from the supply pipe 23 through valve 25 to the manifold 12, and thence downwardly through the gravel bed A' and out through nozzles 64 of manifold 57 and to some extent through holes 62 also, and thence through line 27 and valves 54 and 53 to the drain line 30. This serves to clean the gravel bed A' and wash out sediment to the drain. When it is found necessary to wash the upflow bed A, valves 53, 56, 37a, and 38a are opened permitting the wash water to enter through valve 25 and manifold 12 for upward flow through bed A, whereupon part of the water leaving the tank passes out through valve 37a directly, but the rest passes out through manifold 16 and then out through valve 38a, the two streams then joining and passing through valves 56 and 53 to the drain 30. During this operation the valve 54 is closed. If the downflow bed B is to be backwashed, valves 25 and 55 are closed and valves 50, 51, 53, 54, 56, 37a, and 38a are opened. This permits raw water to enter tank 10 through valves 50 and 51, line 28 and manifold 58, and incidentally the holes 62 in coupling 59. The water enters at a rapid rate, agitating the mineral bed B and thoroughly cleansing the same. The wash water leaving the tank 10 divides into three streams, about one-third passing out through the valve 38a and the balance passing out through manifold 16 and carrying with it some mineral for return to bed A in tank 9. The water entering manifold 16 flows through connecting pipe 19 into tank 9 through manifold 15 where the flow is divided equally, or thereabouts, one part passing out through valve 37a and the rest flowing downwardly through bed A and out through manifold 57 and holes 62 in coupling 59, line 27, and valve 54, where this water joins the water coming from valves 37a and 38a and passes out through valve 53 to the drain 30. While the backwash water flows rapidly through bed B and raises some mineral from the top of the bed, the flow is never fast enough to carry the mineral up beyond the manifold 16, whereas the sediment being lighter than the mineral is readily carried up into this space above the manifold 16 and is therefore removed through valve 38a. Furthermore, in tank 9 the incoming water from the connecting pipe 19 deposits the mineral on the bed A, but any sediment in this water, being lighter, is readily drawn off with the water passing out through valve 37a. It is clear therefore that while I utilize a flow rate sufficient to insure breaking up the mineral bed and separating the sediment from the mineral, I nevertheless avoid danger of loss of mineral by providing for a slow rate of flow for sedimentation in the head space above the manifolds 15 and 16, and in that way the lighter sediment is carried off, but the heavier mineral is left behind.

When the beds A and B require reconditioning or rejuvenating, the proper kind of salt or sterilizing agent, acid, alkali, oxidizing, or reducing agent, is placed in the tank 33' and sufficient water is added through the valve 66 to produce a predetermined concentration. To introduce this chemical into the beds A and B, valves 52, 67 and 68 are opened and all other valves are closed. This permits the injection of a certain amount of chemical from the tank 33' through the ejector 69 into the bottom of the tank 9 where the chemical passes upwardly through bed A and through the connecting pipe 19 and down through bed B and out through valve 52 to the drain 30. After enough of the chemical has been introduced, valves 67 and 68 are closed and valves 54 and 55 are opened, thus permitting water to travel upwardly through bed A and downwardly through bed B and out to the drain 30. When all of the chemical has been flushed out, the unit can be put back into service by closing valve 52 and opening valve 51. This permits up-flow through bed A and downflow through bed B, and the outgoing water is delivered to the service line 29. Sometimes it is desirable not to furnish the tank 33' and the accessories including the ejector 69. The chemicals under those conditions are added through a hand-hole or manhole in the top of tank 9 or 10. Such holes are shown at 70.

Figure 12:
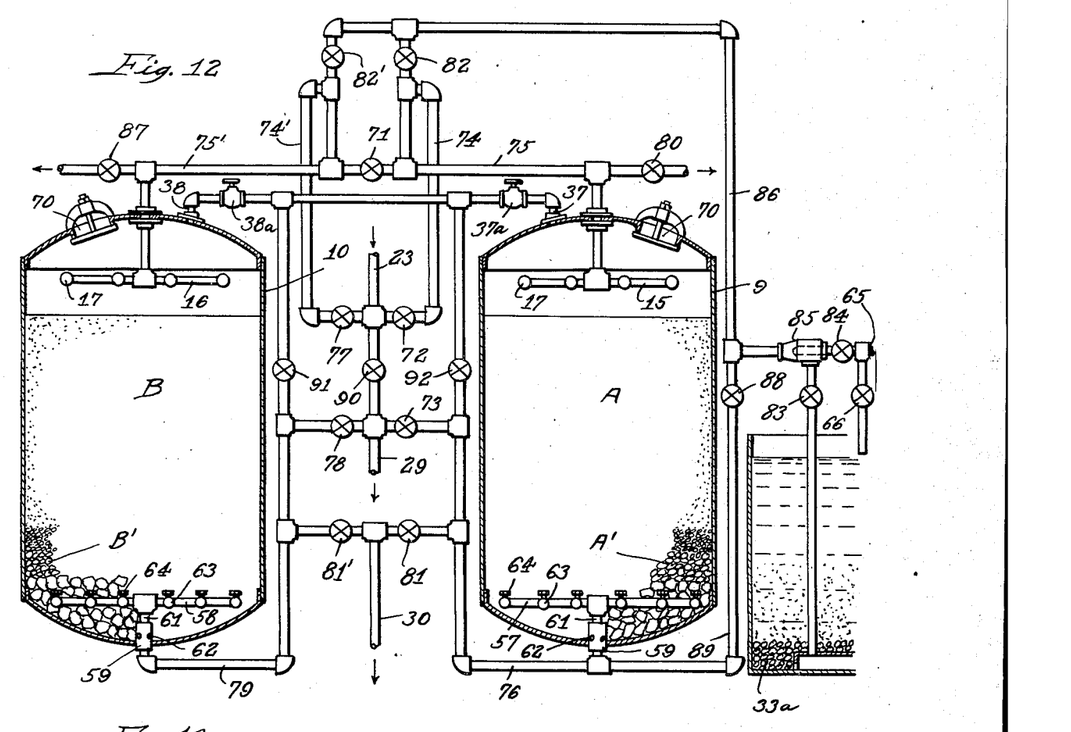
Fig. 12 is another view similar to Fig. 1, showing still another modified or alternative construction for a water conditioning equipment.

*Water conditioner—Fig. 12*

This unit closely resembles that shown in Figs. 9 to 11, the only noteworthy difference being in the valve arrangement which is provided to permit use of both tanks simultaneously or independently and the reconditioning or rejuvenating of the mineral beds therein simultaneously or independently.

In operation the two tanks 9 and 10 may be used as two individual downflow units for softening or otherwise conditioning water. Under these conditions the raw water enters the tops of the two tanks directly from the main 23 and passes out of the bottoms of these tanks directly to the service line 29. The two tanks can be used independently or they can be used at the same time. The principal object of said construction is to provide a water conditioning equipment to be operated on downflow at moderate flow rates, thereby filtering the water and conditioning it and putting it in the correct condition chemically for various purposes while also removing objectionable matter therefrom. In backwashing and rejuvenating the mineral, the tanks can be backwashed at a rapid flow rate to thereby agitate the mineral and remove sediment and other impurities and break up channels and bed-packing without losing zeolite, loss of zeolite being avoided by having a confined bed in backwashing and utilizing the area of the top of each of the tanks 9 and 10 and the bottom of one of the tanks to increase the square foot area for sedimentation equivalent to three times the normal square foot area of either of said tanks.

If the tank 9 is being used while tank 10 is standing idle, valve 71 is closed and valves 72 and 73 are opened. All other valves are closed. The water enters at 23 and flows through valve 72 and lines 74 and 75 into manifold 15 and down through bed A and out through manifold 57 and holes 62 in coupling 59 into line 76 and valve 73 to the service line 29. On the other hand, if tank 10 is being used, valves 71 and 78 are opened and all other valves are closed, assuming that tank 9 is to stand idle. Under these conditions, the incoming water from line 23 passes through valve 77, lines 74' and 75' into manifold 16 and down through bed B and out through line 79 and valve 78 to the service line 29. When both tanks 9 and 10 are used at the same time, valves 72 and 77 are opened and valves 73 and 78 are opened, but all other valves are closed.

When one tank is to be left in service while the other is having its mineral bed rejuvenated, the raw water line leading to the top of the unit in operation is left open and its outlet valve to the service line also. The other unit can then be regenerated, assuming of course that the proper chemical is provided in the tank 33a, whether it be common salt or some sterilizing agent, acid, alkali, oxidizing, or reducing agent. Assuming that tank 9 is to be reconditioned while tank 10 is in service, a supply of water is taken from line 79 and passed through valves 78 and 73 and line 76 into the bottom of tank 9 to flow upwardly through the mineral bed A and thereafter be discharged through manifold 15 and valve 80 to the drain. This rate of flow would be regulated so as not to carry mineral up through the manifold 15 and out to the drain, but on the other hand sufficient to lift the bed up and agitate it to a certain degree. After the bed has been washed sufficiently in that way, valves 73 and 80 are closed. Then the reconditioning chemical from tank 33a is delivered into bed A, either at the bottom of the tank or at the top. When added at the top of the tank, valves 81 and 82 are opened and likewise valves 83 and 84. The valve 71 is closed. With this set-up, the chemical from the tank 33a enters the ejector 85 and flows through line 86 and valve 82 and line 75 into the top of tank 9 through manifold 15. The chemical flows downwardly through the bed A and out through line 76 and valve 81 to the drain 30. After enough chemical has been introduced into the mineral bed A, valve 83 is closed and water continues flowing through valve 84 into the tank 9 and out to the drain 30, and then when the water being discharged from the bottom of the tank is found to be properly conditioned, the tank can be connected to service. That is done by closing valves 81, 82, and 84 and opening valves 72 and 73.

To recondition tank 10 while tank 9 is in operation, the same procedure is followed as follows: To backwash bed B, valve 78 is opened, thus allowing conditioned water from tank 9 to pass through valves 73 and 78 and line 79 into the bottom of tank 10 to flow upwardly through the bed B and out through manifold 16 and valve 87 to the drain. When the unit has been backwashed sufficiently in that way, the valves 87 and 78 are closed. The chemical can then be added similarly as above described, the same flowing through valve 82' and line 75' into the top of tank 10 for passage downwardly through bed B and out of the bottom of the tank through line 79 and valve 81' to the drain 30. After enough chemical has been added, the valve 83 is closed and water continues to flow through valve 84 downwardly through bed B to the drain until all trace of the chemical has been removed, whereupon valves 81' and 82' are closed and likewise valve 84, and then if tank 10 is to be connected to service, valves 77 and 78 are opened.

When the mineral beds A and B are to be reconditioned or rejuvenated at the same time, the beds are first backwashed simultaneously. Then chemical from the tank 33a is delivered through valve 88 to the line 89 into the bottom of tank 9 for passage upwardly through bed A and out through manifold 15 and then through line 75 and valve 71 to line 75' into the top of tank 10 through manifold 16, so as to pass downwardly through bed B and out of the bottom of tank 10 through valve 81' to the drain 30. After enough chemical has been added in that way, valve 83 is closed and water from the valve 84 continues to flow through the two beds and thus washes out the chemical from both tanks. After all of the chemical has been thus removed, valves 81' and 84 are closed. Then, if the unit is to be used as a duplex unit, that is, with both tanks connected to service, valves 73 and 78 are opened and likewise valves 72 and 77. The valve 71 is closed. However, as previously explained, the tanks may be used simultaneously or separately.

In backwashing, a much faster flow rate may be used to better agitate the bed A or B in the following way: For agitating bed A in tank 9, the valves 72 and 77 are closed and valves 73 and 90 are opened, also valves 71, 81', 37a, 38a and 91. This permits the water to flow up through bed A at a very fast rate thoroughly washing and cleansing the bed. In this operation, the freeboard space between the top of the bed A and the manifold 15 would not be sufficient to separate out the sediment and foreign matter from the mineral, hence a part of the mineral is passed into manifold 15 and is carried over through lines 75 and 75' into tank 10. The valve 37a associated with tank 9 can, however, be regulated so that a fast enough flow is permitted in the head space above the manifold 15 to carry out sediment, but not fast enough to carry out mineral from the head space. This sediment carrying waste water flows through valve 37a and through valves 91 and 81' to the drain 30. The mineral that was picked up and carried over into tank 10 is deposited in bed B as it is discharged from manifold 16, but here again the valve 38a is regulated to allow only a fast enough flow in the head space above the manifold 16 to carry out any sediment released from the mineral, but not fast enough to take along the heavier mineral.

Mineral bed B can be backwashed at a fast flow rate in a similar way. In that case, valves 90, 78, 71, 81, 37a, 38a and 92 are opened and all other valves are closed. This permits a rapid rate of upflow through bed B while at the same time a sufficiently reduced flow rate for sedimentation is permitted from the head space above manifolds 15 and 16 by proper regulation of valves 37a and 38a.

It should be understood that if it is desired to operate the tanks as upflow units, then provisions are made for entering the raw water at the bottom and withdrawing the softened or otherwise conditioned water at the top. For illustration, the raw water could enter into the line 30, whereas the softened or otherwise conditioned water could be withdrawn from the line 23. It should further be understood that while I have disclosed a multiplicity of valves in this unit, as well as in the unit shown in Fig. 9, a multi-port valve could be used to replace many of these valves, similarly as shown in Fig. 1, where only one hand operated valve is disclosed in addition to the multi-port valve.

*Further modifications*

The units shown in Figs. 1, 9 and 12, it should be understood, may have the manifold 16 and its supporting short pipe omitted, and also the regulating valve 38' or 38a and its pipe connection 38. Such a unit could be operated successfully where the water is comparatively free from sediment and the primary object in backwashing is to break up and agitate the downflow bed in tank 10. With such a construction, the water in backwashing lifts the mineral in tank 10 and holds it in suspension and some of the mineral on top is carried through the connecting pipe 19 into the top of tank 9 through manifold 15. At that point, a portion of the water is directed downwardly through the mineral bed and out to the drain, thus depositing the entrained mineral on top of the bed. The remainder of the backwash water carrying with it sediment is conducted through the pipe connection 37 and the regulating valve 37' or 37a to the drain. The operation otherwise, that is, for softening or conditioning and the injection of reconditioning chemical and the rinsing out of such chemical, will be the same as with units having top manifolds and surface drains in the top portion of each tank.

In regard to the units shown in Figs. 9 and 12, it should be understood that similar results are obtainable if the bottom manifolds 57 and 58 communicate with pipes extending through the sides of the tanks instead of the bottom, if one or more of the nozzles 64 are placed on the bottom of the laterals 63 so as to induce circulation beneath the manifolds near the bottoms of the tanks, or I may have one or more of the nozzles extended to the extreme bottom of the tank to serve the same purpose as the jet openings 62 in the couplings 59.

It is believed the foregoing description conveys a good understanding of all the objects and advantages of my invention. The appended claims have been drawn with a view to covering all legitimate modifications and adaptations.

I claim:

1. A water conditioner comprising in combination a pair of tanks in connection with a service system, a source of raw water supply under pressure, and a drain, each tank containing a bed of water conditioning material, water distributing means in the lower part of each tank and conduits connected to the lower portions of said tanks for conducting water into one and out from the other, a water distributing manifold above the conditioning material in each tank but below the tops of said tanks, means interconnecting said manifolds for water flow from one tank to the other, said means and manifolds being constructed to convey some of the conditioning material from one tank to the other with the water flowing therethrough, waste outlet conduits communicating with the upper portions of said tanks above the manifolds, both conduits normally communicating with the source of raw water supply but adapted to have communication with the drain, check valves in said conduits normally urged in one direction to closed position under pressure of said raw water source but adapted to open and allow flow of water from both tanks to the drain when the conduits are connected therewith, and valve means adapted to deliver water from the raw water source through either of said first named conduits to the lower part of either of said tanks and to control communication between the waste outlet conduits and the source of raw water supply and the drain.

2. A water conditioner comprising in combination with a service system, source of raw water supply, and a drain, a plurality of tanks, water distributing means in the bottom of each of said tanks, water conditioning material supported thereon, a connecting element communicating with the tanks at a point intermediate the upper surface of the water conditioning material and the top of each of the tanks and adapted to carry fine water conditioning material from one tank to the other in the flow of water through the tanks in either direction, means for delivering raw water from the source interchangeably to the bottom of either endmost tank and concurrently conducting water interchangeably from the bottom of the other endmost tank to the service system or to the drain so that the water flows through the tanks in one direction for conditioning and in the opposite direction in backwashing, a scum outlet connection communicating with the upper portion of each of said tanks above the level of communication therewith of the connecting element, each scum outlet connection having means providing an adjustably fixed restriction therein for flow therethrough in one direction only at a fraction of the rate of flow permitted through the connecting element associated therewith, and valve means permitting outflow of water to the drain through the scum outlet connections only during backwashing.

3. A water conditioner as set forth in claim 2, wherein the last mentioned valve means comprises check valves permitting flow only outwardly from said scum outlet connections, the water conditioner including means arranged during water conditioning to subject said check valves to water pressure from the source of raw water supply toward closing the same.

4. A water conditioner comprising in combination a pair of tanks in connection with a service system, a source of raw water supply, and a drain, each tank containing a bed of water conditioning material, water distributing material in the bottom of one tank and water distributing means in the bottom of the other tank, a water distributing manifold above the conditioning material in each tank but below the tops of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, a single multi-position multi-port control valve having conduits extending therefrom to the service system, the source of raw water supply, and the drain, and two other conduits extending from said control valve and connected to the bottoms of the two tanks, said valve conduits being arranged to have communication established therebetween differently in different positions of the valve, a waste conduit through which the aforesaid waste outlet conduits have communication with one of the two last mentioned conduits, a valve in the latter conduit and a valve in the waste conduit, a cleanout manifold in the water distributing material in the bottom of the first tank, and means for supplying raw water to said manifold from the source of raw water supply.

5. A water conditioner comprising in combination a pair of tanks in connection with a service system, a source of raw water supply, and a drain, each tank containing a bed of water conditioning material, water distributing means in the bottom of each tank, a water distributing manifold above the conditioning material in each tank but below the tops of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, a single multi-position multi-port control valve having conduits extending therefrom to the service system, the source of raw water supply, and the drain, and two other conduits extending from said control valve and connected to the bottoms of the two tanks, all of the valve conduits being arranged to have communication established therebetween differently in different positions of the valve, the aforesaid waste outlet conduits having communication with one of said bottom connections and a valve in the last mentioned bottom connection.

6. The method herein disclosed of removing sediment from a bed of granular material during backwashing which consists in agitating the material by passing wash water rapidly upwardly therethrough in a confining tank wherein there is a freeboard space above the material, withdrawing at a slightly reduced rate the greater portion of the wash water at an elevation slightly above the top of the bed whereby to withdraw suspended particles of the granular material, and withdrawing at a further reduced rate the remaining portion of the wash water at a higher elevation whereby to withdraw suspended relatively light particles of sediment, the last mentioned flow rate being insufficient to entrain the relatively heavier particles of granular material.

7. The method herein disclosed of removing sediment from a bed of granular material during backwashing which consists in agitating the material by passing wash water rapidly upwardly therethrough in a confining tank wherein there is a freeboard space above the material, withdrawing at a slightly reduced rate the greater portion of the wash water at an elevation slightly above the top of the bed whereby to withdraw suspended particles of the granular material, withdrawing at a further reduced rate the remaining portion of the wash water at a higher elevation whereby to withdraw suspended relatively light particles of sediment, the last mentioned flow rate being insufficient to entrain the relatively heavier particles of granular material, and finally retrieving the withdrawn granular material by filtering the fast-flowing wash water withdrawn at the lower elevation.

8. The method of removing sediment from water softening material during backwashing in a two-tank, upflow-downflow softener, one of which tanks is an upflow tank and the other a downflow tank, which method consists in backwashing the downflow tank by passing wash water rapidly upwardly therethrough to agitate the material and dislodge the sediment therefrom, withdrawing the major portion of wash water from said tank from a point intermediate the top of the tank and the top of the material at a slightly reduced rate, so as to withdraw therewith suspended particles of water softening material, withdrawing at a further reduced rate but higher elevation relative to the top of the bed the remaining portion of the wash water, whereby to withdraw suspended relatively light particles of sediment, the last mentioned flow rate being insufficient to entrain the relatively heavier particles of water softening material, and conducting the first mentioned portion of the wash water into the top of the downflow tank and there further dividing the flow so as to withdraw sediment without withdrawing softening material, by introducing said water at a low elevation above the softening material, conducting one portion thereof downwardly through the bed in the upflow tank, whereby to deposit on the bed the particles of softening material carried thereby, and withdrawing from said tank at a higher elevation relative to the top of the bed the rest of the water and remaining sediment carried thereby.

9. A water conditioner comprising, in combination, a pair of tanks containing water conditioning mineral, a raw water distributor in the bottom of one tank, a conditioned water collector in the bottom of the other tank, a source of raw water communicating with the distributor, a conditioned water outlet communicating with the collector, a manifold above the mineral in each tank, means interconnecting said manifolds for the flow of liquid and mineral from one tank to the other, the tanks providing therein a free space above the mineral, drain outlets communicating with the upper portions of said tanks above the manifolds and having therein adjustably fixed restrictions permitting flow only outwardly from the tanks at a fraction of the rate of flow permitted through the manifolds from one tank to the other, whereby to divide the flow of water in backwashing into a plurality of streams one to the drain from the top of the initial tank while another goes to the top of the other tank, and one to the drain from the top of the other tank while the rest of the water goes down through the water conditioning mineral and out to the drain, a drain pipe into which said drain outlets discharge, a shut-off valve in said pipe, and means having connection with the bottoms of said tanks for passing water from the raw water source through the tanks in either direction, the flow being normally upwardly through one tank and downwardly through the other tank during conditioning and vice versa during backwashing.

10. A water conditioner comprising in combination a pair of tanks in connection with a service system, a source of raw water supply, and a drain, each tank containing a bed of water conditioning material, water distributing means in the bottom of each tank, a water distributing manifold above the conditioning material in each tank but below the tops of said tanks, means interconnecting said manifolds for water flow from one tank to the other with conditioning material entrained therewith, waste outlet conduits communicating with the upper portions of said tanks above the manifolds, each of said waste outlet conduits having means providing an adjustably fixed restriction therein for one-way flow only therethrough at a fraction of the rate of flow permitted through the manifolds from one tank to the other, a drain conduit for conducting water from said waste outlet conduits to the drain and a shut-off valve in said drain conduit, control valve means and conduits connecting said valve means to the service system, source of raw water supply, and drain, two other conduits extending from said control valve means and connected one to the bottom of each of said tanks, said conduits being arranged to have communication established therebetween differently in different positions of the control valve means whereby during conditioning one of the two conduits connected to the bottoms of the tanks communicates with the source of raw water supply and the other conduit communicates with the service system, but, during reconditioning, the last named conduit has communication with the source of raw water supply and the other of said last named conduits has communication with the drain.

11. A water conditioner comprising, in combination, a pair of tanks in connection with a service system, a source of raw water supply under pressure, and a drain, each tank containing a bed of water conditioning material, water distributing means in the lower part of each tank, a water distributing manifold above the water conditioning material in each tank but below the tops of said tanks, means interconnecting said manifolds for water flow from one tank to the other, said manifolds and interconnecting means being constructed to convey some of the conditioning material from one tank to the other with the water flowing therethrough, waste outlet conduits communicating with the tops of said tanks above the manifolds, flow proportioning devices providing adjustably fixed restrictions in said conduits permitting regulated flow of waste water only outwardly from the tops of both tanks to the drain in a predetermined proportion to and simultaneously with the backwash flow through said tanks, a drain conduit connected with the waste outlet conduits, a shut-off valve in said drain conduit and valve means for controlling flow through said tanks from the source of raw water supply to the service system and communicating with the lower parts of said tanks.

12. A water conditioner comprising in combination a pair of tanks in connection with a service system, a source of raw water supply, and a drain, each tank containing a bed of water conditioning material, water distributing material in the bottom of each tank, a water distributing manifold above the conditioning material in each tank but below the tops of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, a single multi-position multi-port control valve having conduits extending therefrom to the service system, the source of raw water supply, and the drain, and two other conduits extending from said valve to the bottoms of the two tanks, said valve conduits being arranged to have communication established therebetween differently in different positions of the valve, the aforesaid waste outlet conduits having communication with one of the two last mentioned conduits.

13. A base exchange water softener comprising in combination with a service system, source of raw water supply, and a drain, a plurality of tanks, water distributing means in the bottom of each of said tanks, base exchange material supported thereon, a connecting element communicating with the tanks at a point intermediate the upper surface of the base exchange material and the top of each of the tanks and adapted to carry fine base exchange material from one tank to the other in the flow of water through the tanks in either direction, means for delivering raw water from the source interchangeably to the bottom of either endmost tank and concurrently conducting water interchangeably from the bottom of the other endmost tank to the service system or to the drain so that the water flows through the tanks in one direction for softening and in the opposite direction in backwashing, a scum outlet connection communicating with the upper portion of each of said tanks above the level of communication therewith of the connecting element, each scum outlet connection having means providing an adjustably fixed restriction therein for flow therethrough in one direction only at a fraction of the rate of flow permitted through the connecting element associated therewith, and valve means permitting outflow of water to the drain through the scum outlet connections only during backwashing.

14. A base exchange water softener as set forth in claim 13, wherein the last mentioned valve means comprises check valves permitting flow only outwardly from said scum outlet connections, the water softener including means arranged during softening to subject said check valves to water pressure from the source of raw water supply toward closing the same.

15. A water conditioner comprising, in combination, a pair of tanks in connection with a service system, a source of raw water supply and a drain, each tank containing a bed of water conditioning material, water distributing material in the bottom of one tank and water distributing means in the bottom of the other tank, a water distributing manifold above the conditioning material in each tank but below the tops of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, control valve means and conduits therefor connecting the same to the service system, the source of raw water supply, and the drain, and two other conduits extending from said control valve means and connected to the bottoms of the two tanks, said conduits being arranged to have communication established therebetween differently in different positions of the control valve means, whereby during conditioning one of the two last named conduits communicates with the service system, but, during reconditioning, has communication with the source of raw water supply and the other of said two conduits has communication with the drain, a drain conduit through which the aforesaid waste outlet conduits have communication with one of the two last-named conduits, a valve in the drain conduit and a valve in the conduit with which the drain conduit communicates, a clean-out manifold in the water distributing material in the bottom of the first tank, and means for supplying raw water to said manifold from the source of raw water supply.

16. A water conditioner comprising, in combination, a pair of tanks in connection with a service system, a source of raw water supply and a drain, each tank containing a bed of water conditioning material, water distributing means in the bottom of each tank, a water distributing manifold above the conditioning material in each tank but below the tops of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, control valve means and conduits therefor connecting the same to the service system, the source of raw water supply, and the drain, and two other conduits extending from said control valve means and connected to the bottoms of the two tanks, said conduits being arranged to have communication established therebetween differently in different positions of the control valve means whereby during conditioning one of the two last named conduits communicates with the service system, but, during reconditioning, has communication with the source of raw water supply and the other of said two conduits has communication with the drain, the aforesaid waste outlet conduits having communication with that one of said bottom connections adapted to communicate with the drain, and a valve in the last mentioned bottom connection.

17. A water conditioner comprising, in combination, a pair of tanks in connection with a service system, a source of raw water supply, and a drain, each tank containing a bed of water conditioning material, water distributing means in the bottom of each tank, a water distributing manifold above the conditioning material in each tank but below the upper portions of said tanks, means interconnecting said manifolds for water flow from one tank to the other and to convey conditioning material from one tank to the other with the water flowing therethrough, waste outlet conduits communicating with the upper portions of said tanks above the manifolds, check valves therein permitting flow only outwardly from said tanks, control valve means and conduits therefor connecting the same to the service system, the source of raw water supply, and the drain, and two other conduits extending from said control valve means and connected to the bottoms of the two tanks, said conduits being arranged to have communication established therebetween differently in different positions of the control valve means whereby during conditioning one of the two last named conduits communicates with the service system, but, during reconditioning, has communication with the source of raw water supply and the other of said two conduits has communication with the drain, the aforesaid waste outlet conduits having communication with that one of the two last mentioned conduits adapted to communicate with the drain.

CHESTER T. McGILL.

CERTIFICATE OF CORRECTION.

Patent No. 2,217,692.　　　　　　　　　　　　　　　October 15, 1940.

CHESTER T. McGILL.

It is hereby certified that error appears in the printed specification of the above numbered patent requiring correction as follows: Page 9, first column, line 12, claim 5, for the words "all of the" read --said--; line 17, same claim, after "connections" insert a comma; page 10, first column, line 39-40, claim 12, for "material" read --means--; and that the said Letters Patent should be read with this correction therein that the same may conform to the record of the case in the Patent Office.

Signed and sealed this 10th day of December, A. D. 1940.

(Seal)
　　　　　　　　　　　　　　　　　　　　　　　Henry Van Arsdale,
　　　　　　　　　　　　　　　　　　　Acting Commissioner of Patents.